US009253476B2

(12) United States Patent
Hwang et al.

(10) Patent No.: US 9,253,476 B2
(45) Date of Patent: Feb. 2, 2016

(54) DISPLAY APPARATUS AND CONTROL METHOD THEREOF

(71) Applicant: SAMSUNG ELECTRONICS CO., LTD., Suwon-si (KR)

(72) Inventors: Min-cheol Hwang, Seoul (KR); Jee-hoon Ka, Suwon-si (KR); Jae-sung Park, Anyang-si (KR); Jun-ho Sung, Seoul (KR); Bong-geun Lee, Suwon-si (KR); Sang-jun Lee, Seongnam-si (KR); Bong-hwan Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 289 days.

(21) Appl. No.: 13/915,812

(22) Filed: Jun. 12, 2013

(65) Prior Publication Data

US 2014/0002622 A1 Jan. 2, 2014

(30) Foreign Application Priority Data

Jul. 2, 2012 (KR) ........................ 10-2012-0071887

(51) Int. Cl.
*H04N 13/04* (2006.01)
*H04N 9/47* (2006.01)
*H04N 17/00* (2006.01)

(52) U.S. Cl.
CPC ....... *H04N 13/0402* (2013.01); *H04N 13/0438* (2013.01); *H04N 13/0497* (2013.01); *H04N 17/004* (2013.01)

(58) Field of Classification Search
None
See application file for complete search history.

(56) References Cited

U.S. PATENT DOCUMENTS

| | | | |
|---|---|---|---|
| 2010/0289884 A1* | 11/2010 | Kang ............................. | 348/58 |
| 2011/0032340 A1* | 2/2011 | Redmann et al. ............... | 348/51 |
| 2011/0090308 A1* | 4/2011 | Chen et al. ...................... | 348/43 |
| 2011/0090321 A1* | 4/2011 | Nakagawa et al. ............. | 348/51 |
| 2011/0134229 A1* | 6/2011 | Matsumoto et al. ........... | 348/56 |
| 2011/0261029 A1 | 10/2011 | Moon et al. | |
| 2012/0057780 A1* | 3/2012 | Matsumoto ................... | 382/154 |
| 2012/0147159 A1* | 6/2012 | Wang et al. .................... | 348/56 |
| 2012/0162400 A1* | 6/2012 | Iwanaka et al. ................ | 348/54 |
| 2012/0274749 A1* | 11/2012 | Nakayama et al. ............ | 348/51 |
| 2013/0113887 A1* | 5/2013 | Jeon et al. ....................... | 348/46 |

(Continued)

FOREIGN PATENT DOCUMENTS

GB 2480363 A 11/2011
WO 2011/086593 A1 7/2011

OTHER PUBLICATIONS

Communication dated Sep. 7, 2015, issued by the European Patent Office in counterpart European Application No. 13173876.7.

*Primary Examiner* — Dave Czekaj
*Assistant Examiner* — Talha Nawaz
(74) *Attorney, Agent, or Firm* — Sughrue Mion, PLLC

(57) ABSTRACT

A display apparatus is provided. The display apparatus includes an image receiver which receives an image, an image processor which divides the received image into a left-eye image and a right-eye image and processes the same, an image output device which alternatingly outputs the left-eye image and the right-eye image, and a controller which calculates a difference in a pixel value between the left-eye and right-eye images based on units relating to the pixels that constitute the left-eye and right-eye images, detects a crosstalk generating area by using the calculated pixel value difference and a preset response speed of a display panel, and controls so that the detected crosstalk generating area is displayed distinguishably from at least one other area.

19 Claims, 13 Drawing Sheets

(56) References Cited

U.S. PATENT DOCUMENTS

| | | | |
|---|---|---|---|
| 2013/0120363 A1* | 5/2013 | Kang | 345/419 |
| 2013/0135297 A1* | 5/2013 | Kobayashi et al. | 345/419 |
| 2013/0229498 A1* | 9/2013 | Yano et al. | 348/51 |
| 2014/0022340 A1* | 1/2014 | Dane et al. | 348/42 |

* cited by examiner

DISPLAY APPARATUS AND CONTROL METHOD THEREOF

CROSS-REFERENCE TO RELATED APPLICATIONS

This application claims priority from Korean Patent Application No. 2012-0071887, filed in the Korean Intellectual Property Office on Jul. 2, 2012, the disclosure of which is incorporated herein by reference in its entirety.

BACKGROUND

1. Field

Aspects of the exemplary embodiments relate to a display apparatus and control method thereof, and more particularly, to a display apparatus for displaying a three dimensional (3D) image and a control method thereof.

2. Description of the Related Art

Three dimensional (3D) image technology is considered to be the core base technology of the next-generation 3D image multimedia information communication, as such technology is applicable in a variety of areas including, for example, information communication, broadcasting, medicine, education, training, the military, computer games, animation, virtual reality, computer-aided design (CAD), and industrial technology, and commonly required in these areas.

The illusion of depth is perceived by humans based on a combination of a variation of thickness of eye lens with respect to a location of an observed object, an angular difference between respective lines of sight for each of a left eye and a right eye and the observed object, a respective difference of each of a location and a shape of the observed object as perceived by each of both eyes, a disparity generated in accordance with the movement of the object, and other mental effects and memories.

Among these, the "binocular disparity," which is generated due to respective locations of a human's two eyes at a distance of approximately 6 to 7 cm in horizontal direction, functions as the most important element that contributes to the illusion of depth. The binocular disparity causes the human to view an object at two different angles, which cause two different images to enter the respective eyes, so that the two images are transmitted to the brain where the two pieces of information are precisely fused with each other to provide a perception of a 3D image.

A 3D image display may generally be categorized into a glass type of display which employs special-purpose glasses, and a non-glass type of display which does not employ the glasses. The glass type may be categorized into a color filter type which separates and selects images using color filters complement to each other, a polarizing filter type which divides an image into left-eye and right-eye images by using a light shading effect by the combination of polarizing devices which are orthogonal to each other, and a shutter glass type which provides a sensation of depth by alternatingly shielding left and right eyes in accordance with the synchronous signal which projects left-eye and right-eye image signals onto a screen.

Typically, a conventional display may frequently experience crosstalk while displaying left-eye and right-eye images due to response speed of a display panel. In particular, the amount of crosstalk generally increases as the gradation of left-eye and right-eye images increases.

However, since an area having crosstalk is not indicated, it is difficult to solve the defects in making or editing contents, particularly in the monitoring process for broadcasting.

SUMMARY

Aspects of the exemplary embodiments relate to an apparatus and a method for processing an image which allow a stereoscopic image to be recognized by a left eye and a right eye accurately and an apparatus and a method for displaying using the same.

A display apparatus, according to an exemplary embodiment, includes an image processor which divides a received image into a left-eye image and a right-eye image and processes the left-eye image and the right-eye image, an image output device which alternatingly outputs the left-eye image and the right-eye image, and a controller which calculates a pixel value difference between the left-eye image and the right-eye image based on units relating to pixels that constitute the left-eye image and the right-eye image, detects a crosstalk generating area by using the calculated pixel value difference and a preset response speed of a display panel, and controls so that the detected crosstalk generating area is displayed distinguishably with respect to at least one other area.

The controller may control so that the crosstalk generating area is divided into a plurality of levels based on a respective generated degree of crosstalk and so that each of the plurality of levels is displayed in a respective form.

The controller may control so that each of the plurality of levels is displayed by using a respective color.

The controller may control so that the detected crosstalk generating area is divided into a plurality of levels based on a respective generated degree of crosstalk and so that only a level having a corresponding generated degree of crosstalk which is higher than a preset threshold degree of crosstalk from among the plurality of levels is displayed.

The controller may control so that only the crosstalk generating area is displayed by using a same color.

The controller may control so that the crosstalk generating area is displayed as an overlay with respect to the received image.

The controller may control so that a transparency of the crosstalk generating area varies as a function of time.

The controller may determine an area in which the calculated pixel value difference is higher than a preset reference value as a possible crosstalk generating area, and detect the crosstalk generating area by checking a response speed of a display panel based on a respective change in each of a pixel value of the left-eye image and the right-eye image with respect to the determined possible crosstalk generating area.

The controller may control so that the possible crosstalk generating area is displayed distinctively with respect to at least one other area.

The display apparatus may further include a storage device which stores the preset response speed of the display panel.

The display apparatus may further include a communication device which receives the preset response speed of the display panel by communicating with an external apparatus, and the controller may detect the crosstalk generating area by using the received preset response speed of the display panel.

A method for controlling a display apparatus according to an exemplary embodiment includes separating a received image into a left-eye image and a right-eye image and processing the left-eye image and the right-eye image, outputting the left-eye image and the right-eye image alternatingly, calculating a pixel value difference between the left-eye image and the right-eye image based on units relating to pixels that constitute the left-eye image and the right-eye image, detecting a crosstalk generating area by using the calculated pixel value difference and a preset response speed of a display panel, and displaying the detected crosstalk generating area distinguishably with respect to at least one other area.

The displaying may include dividing the detected crosstalk generating area into a plurality of levels based on a respective generated degree of crosstalk, and displaying each of the plurality of levels in a respective form.

The displaying may include displaying each of the plurality of levels by using a respective color.

The displaying may include dividing the detected crosstalk generating area into a plurality of levels based on a respective generated degree of crosstalk, and displaying only a level having a corresponding generated degree of crosstalk which is higher than a preset threshold degree of crosstalk from among the plurality of levels.

The displaying may include overlaying the crosstalk generating area with respect to the received image and displaying the overlaid crosstalk generating area.

The displaying may include varying a transparency of the crosstalk generating area as a function of time.

The detecting the crosstalk generating area may include determining an area in which the calculated pixel value difference is higher than a preset reference value as a possible crosstalk generating area, and detecting the crosstalk generating area by checking a response speed of the display panel based on a respective change in each of a pixel value of the left-eye image and the right-eye image with respect to the determined possible crosstalk generating area.

The method may further include displaying the possible crosstalk generating area distinctively with respect to at least one other area.

The preset response speed of the display panel may include at least one of a display response speed which corresponds to a pre-stored pixel value change and a display response speed which corresponds to a pixel value change received from an external source.

BRIEF DESCRIPTION OF THE DRAWINGS

The above and/or other aspects of the present disclosure will be more apparent by describing certain exemplary embodiments with reference to the accompanying drawings, in which.

DETAILED DESCRIPTION

Figure 1:
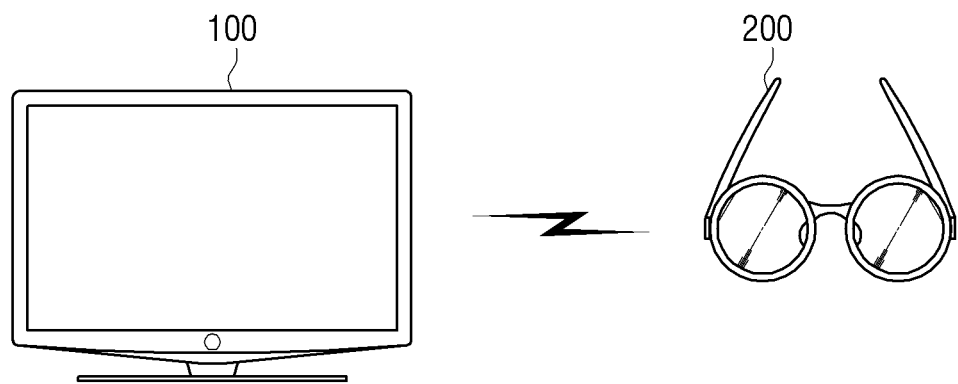
FIG. 1 illustrates a 3D image providing system according to an exemplary embodiment.

Certain exemplary embodiments are described in greater detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. In addition, well-known functions or constructions are not described in detail since they would obscure the application with unnecessary detail.

FIG. 1 illustrates a system for providing a three-dimensional (3D) image according to an exemplary embodiment. Referring to FIG. 1, the 3D image providing system may include a display apparatus 100 which displays a 3D image on a screen, and 3D glasses 200 which may be worn by a user in order to watch the 3D image.

The display apparatus 100 may receive a 2D image received from a photographing device such as, for example, a camera, a 3D image, or a 3D image which is captured by using a camera, edited/processed at a broadcasting station and transmitted from the broadcasting station. The display apparatus 100 may then process the received image and display the resultant image on the screen. In particular, the display apparatus 100 may process the left-eye and right-eye images by referring to the 3D image format so that the processed left-eye and right-eye images are time-divided and displayed alternatingly.

The 3D glasses 200 may be implemented as active type, which may be the shutter glasses which synchronize with the respective display time point of each of left-eye and right-eye images displayed on the display apparatus 100 and turn on/off the left-eye and right-eye shutters. However, an exemplary embodiment is not limited to the specific example provided above. Accordingly, the 3D glasses 200 may be implemented in other forms, such as, for example, passive type polarization glasses in which left and right eyes have different polarizations from each other.

Further, the image providing system according to an exemplary embodiment may additionally include a camera (not illustrated) which may be used to generate a 3D image.

The camera (not illustrated) is one of the photographing devices which may be used to generate a 3D image, and may generate a left-eye image which is captured to be provided to the left eye of the viewer, and a right-eye image which is captured to be provided to the right eye of the viewer. In particular, the 3D image includes left-eye and right-eye images, which are alternatingly provided to left and right eyes of the viewer to generate a sensation of depth by binocular disparity.

Accordingly, the camera (not illustrated) may include a left-eye camera which is used to generate a left-eye image and a right-eye camera which is used to generate a right-eye image, at distance from each other in consideration of the distance between the two eyes of the viewer.

The camera (not illustrated) may transfer the captured left-eye and right-eye images to the display apparatus 100. In particular, the left-eye and right-eye images transferred from the camera (not illustrated) to the display apparatus 100 may be in such a format in which a frame contains purely either one of the left-eye and right-eye images, or a format in which a frame contains both of the left-eye and right-eye images.

The camera (not illustrated) may determine one of various 3D image formats in advance and generate the 3D image based on the determined format and accordingly transfer the generated 3D image to the display apparatus 100.

Figure 2:
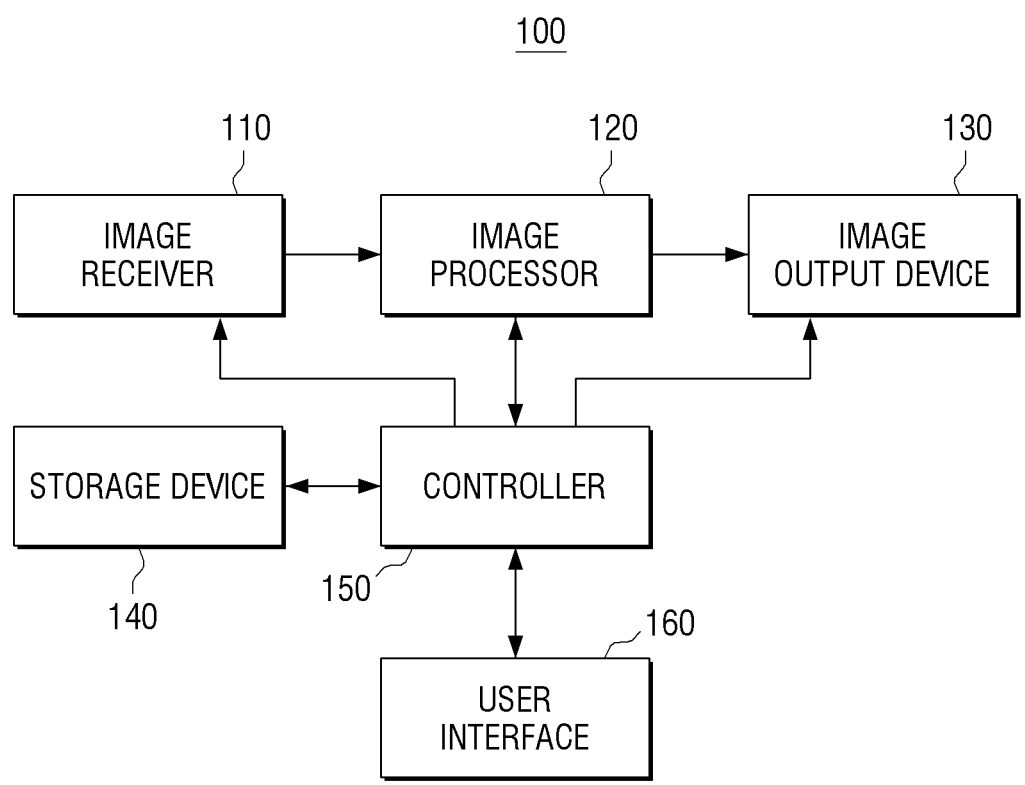
FIG. 2 is a block diagram of the display apparatus 100 of FIG. 1.

FIG. 2 is a block diagram of the display apparatus 100 of FIG. 1.

Referring to FIG. 2, the display apparatus 100 may include an image receiver 110, an image processor 120, an image output device 130, a storage device 140, a controller 150, and a user interface 160.

The image receiver 110 may receive a broadcast which may be received from broadcasting station or satellite by wired or wireless manner, and may demodulate the received broadcast. Further, the image receiver 110 may be connected to an external device, such as, for example, a camera, in order to receive a 2D image or a 3D image from the connected external device. The camera may be connected to the external device wirelessly, or by wired manner via use of an interface such as S-Video, component, composite, D-Sub, DVI, or HDMI.

The 3D image includes at least one frame, each of which may contain either a left-eye image or a right-eye image, or alternatively, may contain both of the left-eye and right-eye images. In particular, the 3D image is generated according to one of various 3D formats.

Accordingly, the image receiver 110 may receive various formats of 3D images, which may include, for example, top-bottom format, side-by-side format, horizontal interleaving format, vertical interleaving format or checker board format, or sequential frame format.

The image receiver 110 may transfer the received 2D or 3D image to the image processor 120.

The image processor 120 may perform signal processing functions, including at least one of video decoding, format analysis, and/or video scaling, and other operations including GUI addition.

In particular, the image processor 120 may generate left-eye and right-eye images which correspond to the size of a screen (e.g., 1920*1080) by using the format of the image received by the image receiver 110.

By way of example, if the 3D image received via the image receiver 110 is formatted in one of a top-bottom format, a side-by-side format, a horizontal interleaving format, a vertical interleaving format, or a checker board format, or a sequential frame format, the image processor 120 may extract left-eye and right-eye portions from the respective image frames, and up-scale or interpolate the extracted left-eye and right-eye images in order to provide same to the viewer.

Further, the information relating to the received 3D image format may or may not be included in the 3D image signal.

By way of example, if the information relating to the received 3D image format is included in the 3D image signal, the image processor 120 may analyze the 3D image and extract the information relating to the format, and process the received 3D image based on the extracted format information. Conversely, if the 3D image signal does not contain information relating to the format of the received 3D image, the image processor 120 may process the received 3D image according to a format as inputted by the user, or according to a preset format.

Further, if a 2D image is received via the image receiver 110, the image processor 120 may convert the received image into a 3D image, and divide the converted 3D image into left-eye and right-eye images for processing.

The image processor 120 may time-divide the extracted left-eye and right-eye images and transfer the images to the image output device 130 alternatingly. In particular, the image processor 120 may transfer the left-eye and right-eye images to the image output device 130 in the following time order: left-eye image (L1)→right-eye image (R1)→left-eye image (L2)→right-eye image (R2)→ and so on.

The image output device 130 may alternatingly output the left-eye and right-eye images as outputted from the image processor 120 in order to provide the same to the viewer.

Figure 4:
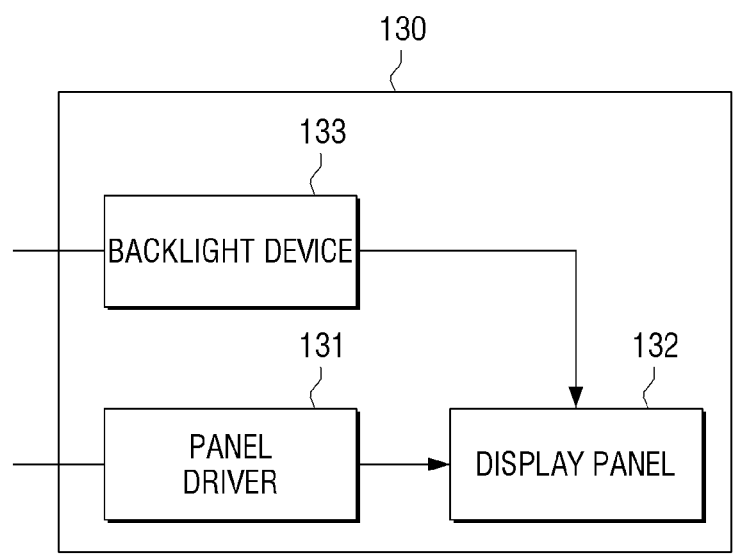
FIG. 4 is a detailed block diagram of an image output device 130 according to an exemplary embodiment.

FIG. 4 is a detailed block diagram of the image output device 130 according to an exemplary embodiment.

Referring to FIG. 4, the image output unit 130 may include a panel driver 131, a display panel 132 and a backlight device 133.

The display panel 132 operates to display the left-eye and right-eye images, and may be implemented as, for example, at least one of a liquid crystal display (LCD) panel, an organic light-emitting diode (OLED) panel, and/or a plasma display panel (PDP).

The display panel 132 may be implemented to include red-green-blue (RGB) pixels, in which each of the RGB pixels may illuminate concurrently or sequentially according to control performed by the controller 150.

The panel driver 131 operates to drive the display panel 132 according to the control performed by the controller 150.

The backlight device 133 may include a backlight illuminating device (not illustrated) which may emit light onto the display panel 132, and a backlight driver (not illustrated) which may drive the backlight illuminating device (not illustrated).

The backlight device 133 may be provided when the display panel 132 requires a separate backlight light source, such as, for example, an LCD panel, and may not be implemented for a panel such as an OLED panel which includes a self-illuminating device.

The backlight driver (not illustrated) may have a plurality of scanning pulses that construct one frame cycle, and generate a scanning signal regulated according to the control performed by the controller 150 in order to drive the backlight illuminating device (not illustrated).

The backlight illuminating device (not illustrated) may emit light onto the display panel 132, and may use one of a white light emitting diode (LED) or a color LED as a light source. However, the above-mentioned example is not limiting. In particular, the backlight illuminating device (not illustrated) may be implemented in at least one other form, for example, as one of Cold Cathode Fluorescent Lamp (CCFL), Hot Cathode Fluorescent Lamp (HCFL), Surface-conduction Electron-emitter Display (SED), or Field Emission Display (FED).

Further, the backlight illuminating device (not illustrated) may be divided into a preset number of areas and scan-driven by the backlight driver (not illustrated). The preset number of areas may be defined according to line unit, or block unit. As used herein, the "block" may include a preset number of lamps, in which case the backlight driver (not illustrated) may be constructed to turn on and off in a block-wise manner.

In the above example, the controller 150 may control the backlight driver (not illustrated) to drive the backlight illuminating device (not illustrated) at a preset time point at which the left-eye and right-eye images are displayed.

The storage device 140 is a recording medium which stores therein various programs necessary for operating the display apparatus 100, and may be implemented, for example, as a memory, or as a hard disk drive (HDD).

In particular, the storage device 140 may store response speed information relating to the display panel 132 in tabular form. In particular, the storage device 140 may store the respective response speed of the display panel 132 in accordance with a corresponding change in pixel values.

By way of example, the storage device 140 may store the response speed information relating to the display panel 132 in the form of a gray-to-gray response time (G-G RT) table. The table may be prepared by measuring a response speed of the panel, or may be obtained from the panel manufacturer.

The controller 150 may control the overall operation of the display apparatus 100 based on the user command or commands transferred from the user interface 160, which is described in detail below.

In particular, the controller 150 may control the image receiver 110 and the image processor 120 to divide the received 2D or 3D image into left-eye and right-eye images, and to scale or interpolate the divided left-eye and right-eye images to a size which is suitable for displaying on one screen.

More particularly, the controller 150 may calculate a pixel value difference with respect to respective pixel units between the left-eye and right-eye images, and detect the area having crosstalk by using the calculated pixel value difference and a pre-determined response speed of the display panel. Herein, the response speed of the display panel may be stored in the storage device 140, or may be received from an external source.

Further, the controller 150 may determine the area possibly having crosstalk with reference to the calculated pixel value differences, and detect the crosstalk generating area by checking response speed in accordance with the variation of the pixel values of the left-eye and right-eye images with respect to the area determined to possibly have crosstalk.

The pixel value difference may be calculated by applying the following equation:

$$Res[i][j] = LImage[i][j] - RImage[i][j] \quad \text{[Mathematical formula 1]}$$

wherein, i, j denote respective pixel coordinates of a received image.

In addition, the controller 150 may control to display information relating to a crosstalk generating area which is calculated based on the respective pixel value differences between corresponding left-eye and right-eye images, or a crosstalk generating area which is calculated based on the respective differences and the response speed of the display panel. Herein, the display information may include a display image which displays corresponding areas distinctively with respect to the remaining areas.

Further, the controller 150 may control the crosstalk generating area to be displayed in different forms based on the respective generated degree of crosstalk. By way of example, the crosstalk generating area may be divided into a plurality of levels based on the respective generated degree of crosstalk, and each of the plurality of levels may be displayed by using a different respective color or a different respective grayscale value. In the above example, the area having larger variation in grayscale in the above-mentioned G-G RT table may be indicated by using a deeper color.

Further, the controller 150 may control so that only the display information which corresponds to an area having a generated degree of crosstalk which exceeds a preset threshold from among crosstalk generating areas is displayed.

In addition, the controller 150 may control so that the crosstalk generating area is displayed by using a same color.

In the above example, the controller 150 may control only the crosstalk generating area to be displayed or an original image to be overlain by the crosstalk generating area and then displayed. In addition, the controller 150 may control the crosstalk generating area to be displayed distinctively from at least one other area in the original image. In this case, the controller 150 may display the crosstalk generating area by verifying the transparency of the crosstalk generating area.

Further, in some instances, the controller 150 may display a possible crosstalk generating area, that is, an area in which the difference in pixel value between the left-eye and right-eye images is higher than a preset value, in different forms based on the degree of the difference in pixel value. As the above-mentioned display method may also be applied to the corresponding area, the detailed description will be omitted.

The user interface 160 may transfer a user command received from an input device, such as, for example, a remote controller, to the controller 150.

In particular, the user interface 160 may receive a reference value which is then used to determine the area possibly having crosstalk.

In one exemplary embodiment, if the calculated pixel value is larger than the reference value which is received via the user interface 160, the controller 150 may detect the corresponding area as the area possibly having crosstalk. However, other embodiments are possible. Further, the reference value for determining area possibly having crosstalk may be set as a default value.

In addition, according to another exemplary embodiment, the controller 150 may be provided with the response speed of a display panel from an external apparatus (not shown) via a communication device (not shown).

In particular, the controller 150 may provide a menu which enables a user to select an external apparatus (not shown) which is connected to the display apparatus 100 by providing a crosstalk preview mode, and receive information relating to the response speed of a display panel from the selected external apparatus (not shown). In this case, the external apparatus (not shown) may include another apparatus which is connected via at least one of a USB memory, an application providing a manufacturer via Ethernet, and HDMI.

In the above exemplary embodiment, the controller 150 may calculate the pixel value difference between the left and right images of a received image and detect a crosstalk generating area based on the calculated pixel value difference and the response speed of a display panel which is received from an external apparatus (not shown).

Accordingly, in case where considerable amount of LUT data for each area/temperature is required based on specifications relating to a display panel, the display apparatus 100 does not need to store corresponding data in the display apparatus 100 and instead, may be provided with the corresponding data via an external apparatus (not shown).

If the above-mentioned method is used, another external apparatus (not shown) instead of the display apparatus 100 may detect and provide a crosstalk generating area. In particular, instead of data relating to the response speed of a display panel being pre-stored in the display apparatus 100, data relating to the response speed of a display panel of an external display apparatus, which is received from an external apparatus (not shown) or an external display apparatus (not shown), may be loaded onto a logic processor, and a crosstalk generating area relating to a received image may be detected.

In this case, the display panel of another external display apparatus (not shown) may have the same physical properties as the display panel of the display apparatus 100. For example, if the display panel of the display apparatus 100 is a LCD panel, the display panel of the external apparatus (not shown) may also be a LCD panel.

Further, another external display apparatus (not shown) may be a 3D display apparatus which is configured to execute the same 3D driving method as the display apparatus 100. For example, if the display apparatus 100 is a 3D display apparatus using an active shutter glass method, the external display apparatus (not shown) may also be a 3D display apparatus using an active shutter glasses method.

Accordingly, a crosstalk generating area which occurs in various display apparatus with respect to a received image may be detected and provided.

Further, in one exemplary embodiment, if the crosstalk generating area is detected, a 3D option setup guideline may be provided in order to minimize the crosstalk effect at the detected crosstalk generating area. The 3D option may include a CTR option, a glass duty operation related option, or the like.

In particular, if a crosstalk generating area relating to corresponding content is detected via the display apparatus 100, the 3D option setup guideline may be added to the content which is provided to the viewer, in order to minimize the crosstalk effect at the detected crosstalk generating area. The setup guideline may include a 3D option based on at least one of display device manufacturer and product model.

Accordingly, the viewer may set up the 3D options based on the guideline, and thus minimize a crosstalk effect on the corresponding content.

Table 1 illustrates the response speed of a panel according to an exemplary embodiment:

TABLE 1

| Example | 64 | 200 | 255 |
|---|---|---|---|
| 64 | — | 3.7 ms | 3.4 ms |
| 200 | 4.6 ms | — | 6.2 ms |
| 255 | 8.1 ms | 8.9 ms | — |

As illustrated in Table 1, the response speed of a display panel according to each pixel value may be pre-stored in a display apparatus. In particular, the respective response speed of a display panel according to each corresponding variation in each pixel value may be stored in tabular form.

By way of example, if an image has a left-eye image frame having a 255/255/255 RGB pixel value, and a right-eye image frame having a 64/200/64 RGB pixel value, the R pixel value may vary between 255 and 64, the G pixel value may vary between 255 and 200, and the B pixel value may vary between 255 and 64.

In the above example, the respective response speeds of the panel are 8.1 ms, 8.9 ms, and 8.9 ms, and it is possible to detect the crosstalk generating area by using these values. In particular, it is possible to detect the crosstalk generating area by averaging respective response speeds based on corresponding pixel values, and comparing the calculated average response speed with a preset threshold.

If the crosstalk generating area is detected, the specific pixel value having crosstalk may be constructed into tabular form and provided to the panel manufacturer, content provider, and/or any other suitable recipient.

Figure 3:
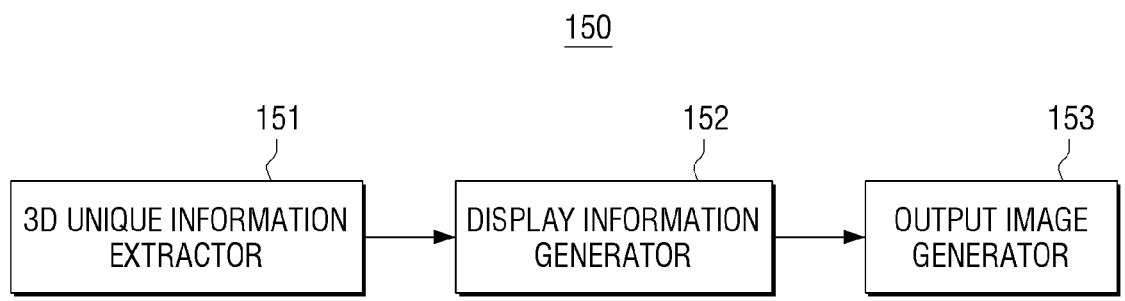
FIG. 3 is a detailed block diagram of a controller 150 according to an exemplary embodiment.

FIG. 3 is a block diagram which illustrates a specific configuration of the controller 150 according to an exemplary embodiment.

Referring to FIG. 3, the controller 150 may comprise a 3D unique information extractor 151, a display information generator 152, and an output image generator 153.

The 3D unique information extractor 151 determines a possible crosstalk generating area by calculating the pixel value difference with respect to each pixel unit of corresponding left-eye and right-eye images.

Further, the 3D unique information extractor 151 may detect a crosstalk generating area based on the determined possible crosstalk generating area and the response speed of a display panel stored in the storage device 140.

In particular, the 3D unique information extractor 151 may detect a crosstalk generating area by checking the response speed based on a respective change in pixel value of each of the left-eye and right-eye images relating to the possible crosstalk generating area which is determined by the 3D unique information extractor 151.

The display information generator 152 generates display information which indicates the possible crosstalk generating area or the crosstalk generating area extracted by the 3D unique information extractor 151.

In particular, the output image generator 153 may generate display information for displaying the possible crosstalk generating area or the crosstalk generating area by using different respective colors for each corresponding level, displaying only the crosstalk generating area having a degree of crosstalk which is higher than a specific threshold degree of crosstalk by using a different color, or displaying the crosstalk generating area having a degree of crosstalk which higher than a specific threshold degree of crosstalk by using a same color.

The output image generator 153 may generate an output image by combining the left-eye and right-eye images which are output from the image processor 120 with the display information generated by the display information generator 152.

However, in some instances, an output image may be generated by using only the display information generated by the display information generator 152.

Figure 5A:
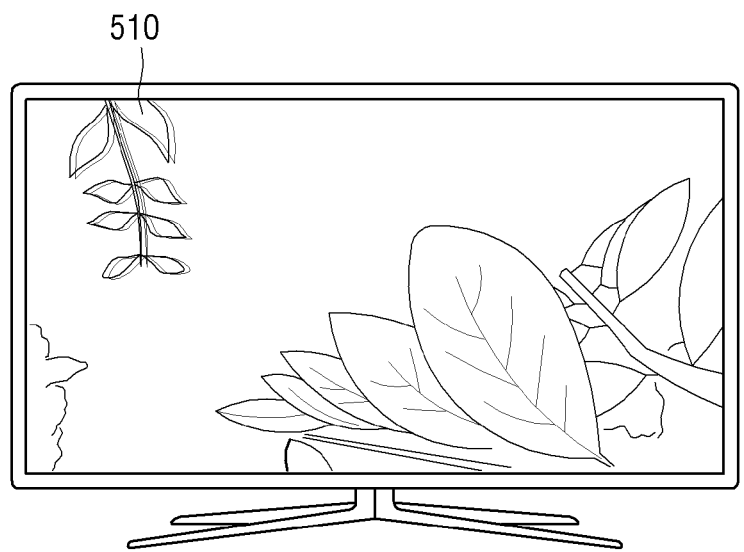
FIGS. 5A and 5B are views which illustrate a method for displaying a crosstalk generating area according to an exemplary embodiment.
Figure 5B:
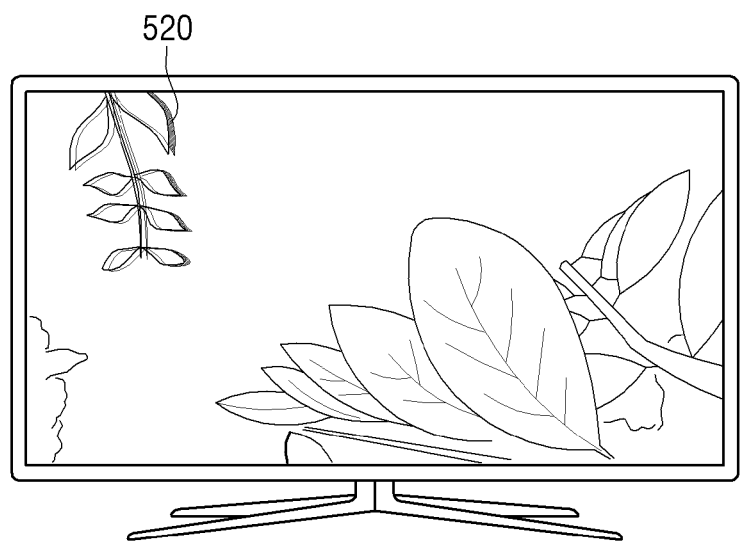

FIGS. 5A and 5B are views which illustrate a method for displaying a crosstalk generating area according to an exemplary embodiment.

FIG. 5A illustrates a phenomenon in which the crosstalk is generated, according to an exemplary embodiment. Referring to FIG. 5A, if a crosstalk phenomenon occurs at a preset portion 510 of the displayed area, the crosstalk generating area that causes the phenomenon may be detected and displayed.

FIG. 5B illustrates an example in which the crosstalk generating area is distinguishably indicated, according to an exemplary embodiment.

Referring to FIG. 5B, it is possible to detect the crosstalk generating area 520 by using pixel values of the image portions to the left and to the right with respect to the area at which the crosstalk phenomenon occurs, and by using the response speed which corresponds to the respective pixel value difference, and then to indicate the detected area 520 distinguishably from other areas within the image.

In one exemplary embodiment, a longer response time and a shorter response time with reference to a preset threshold time may be indicated by using different grayscale values from each other.

Figure 6A:
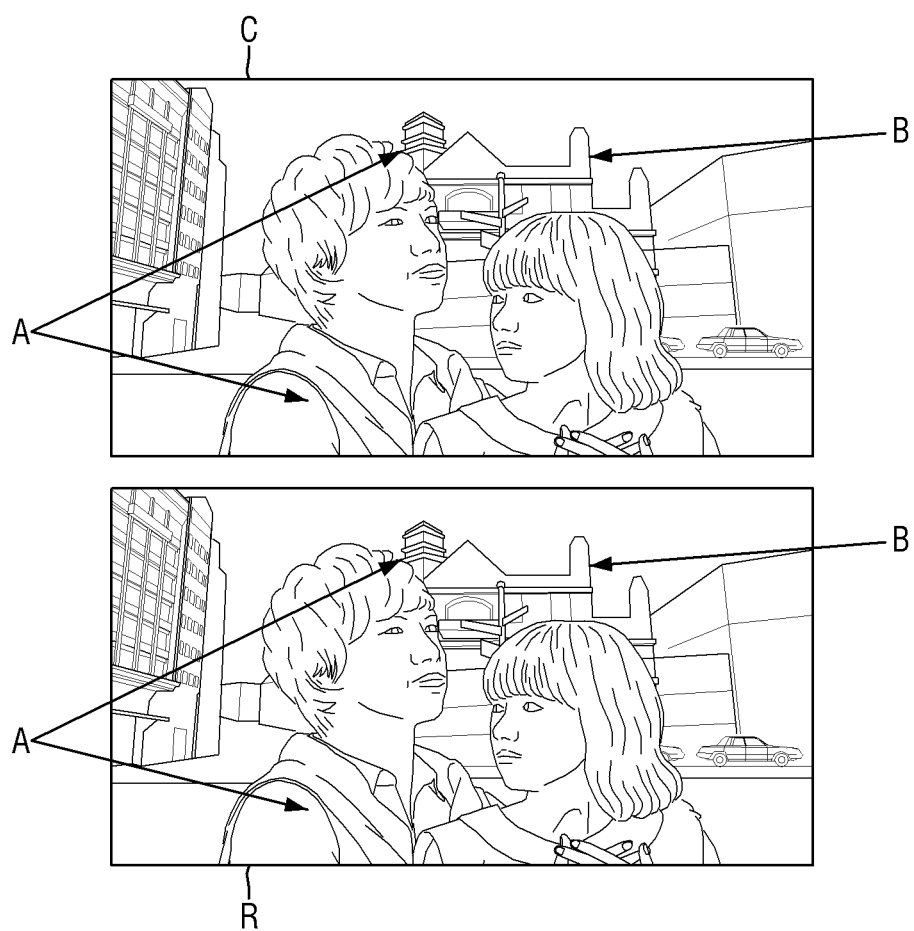
FIGS. 6A, 6B, and 6C are views which illustrate a method for detecting a crosstalk generating area according to an exemplary embodiment.
Figure 6B:
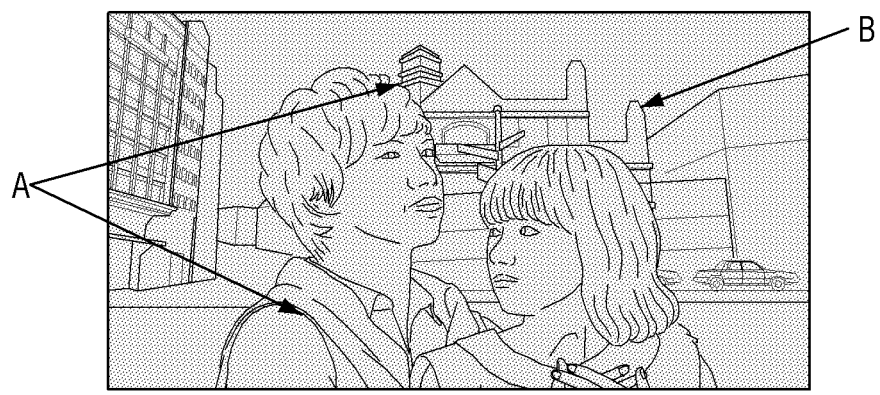
Figure 6C:
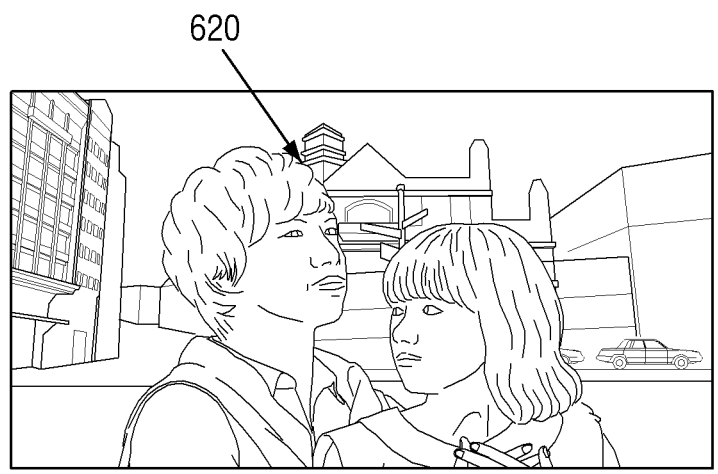

FIGS. 6A, 6B, and 6C are views which illustrate a method for detecting a crosstalk generating area, according to an exemplary embodiment.

Referring to FIG. 6A, a difference of respective areas or pixel values is detected from the left-eye and right-eye images divided from the 3D image. The example illustrated in FIG. 6A will be particularly described below, where the pixel value difference between areas A and B of the left-eye image is detected.

Referring to FIG. 6B, as a result of detecting a pixel value difference, if a pixel value difference is detected between the left-eye image and the right-eye image of area A, while no pixel value difference is detected between the left-eye and right-eye images in area B, area A may be determined to be the area possibly having crosstalk.

By way of example, if the left-eye image frame of area A has a 255/200/2564 RGB pixel value and the right-eye image frame has a 200/200/255 RGB pixel value, area A is detected as having a pixel value difference. Further, if the left-eye image frame in area B has a 0/200/200 RGB pixel value and the right-eye image frame has a 0/200/200 RGB pixel value, area B may be detected as having no pixel value difference.

Then, in area A, which has been detected as having a pixel value difference between the left-eye and right-eye images, a response speed of the panel may be detected in accordance with the variation of pixel values in the left-eye and right-eye images. Accordingly, referring also to FIG. 6C, if it is determined that a lower portion of area A has a faster response speed than the preset threshold, but an upper portion of area A has a slower response speed than the preset threshold, the upper portion 620 of area A may be indicated to be the crosstalk generating area.

Although the area finally confirmed as having crosstalk may be indicated as illustrated in FIG. 6C, this is not limiting. Accordingly, in some instances, the area at which a pixel value difference is detected may be distinguishably displayed with respect to at least one other area within the received image.

Figure 7A:
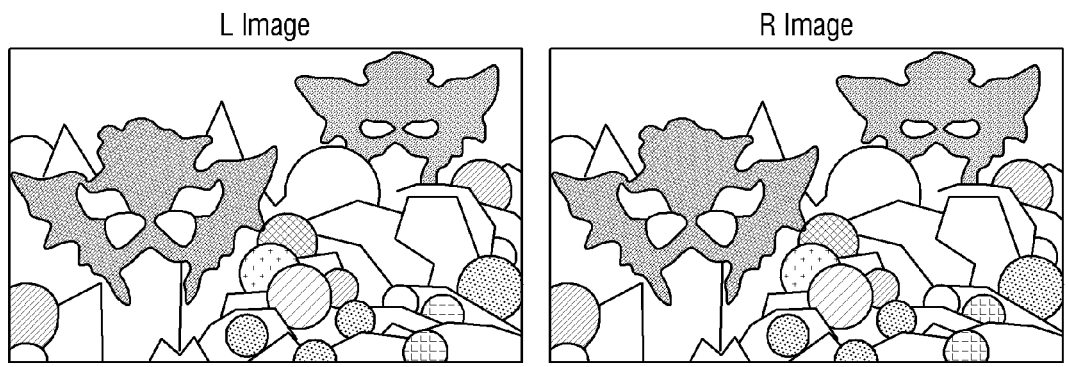
FIGS. 7A, 7B, and 7C are views which illustrate an image shape for further understanding of an exemplary embodiment.
Figure 7B:
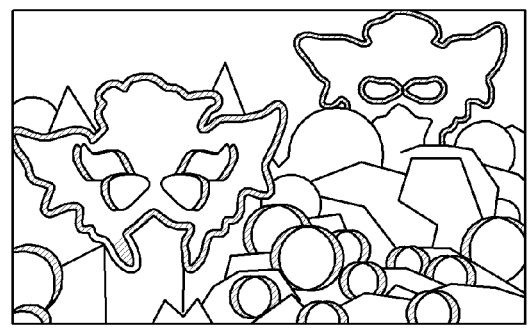

FIGS. 7A and 7B are views which illustrate an image shape for further understanding of an exemplary embodiment.

FIG. 7A is a view which illustrates the respective shapes of the left-eye and right-eye images of a received original image.

FIG. 7B is a view which illustrates a disparity image indicating a disparity between the left-eye and right-eye images illustrated in FIG. 7A, based on a difference in a pixel value (or a grayscale value) between the left-eye and right-eye images.

Figure 7C:
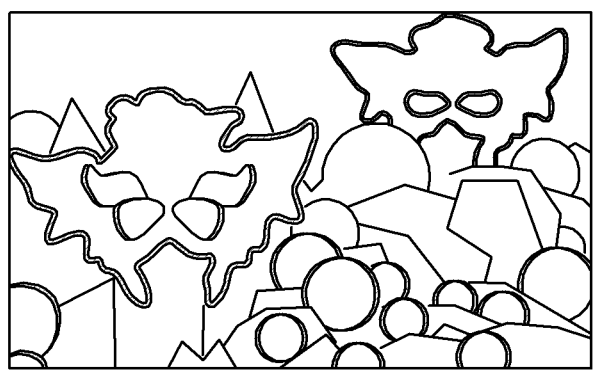

FIG. 7C indicates a possible crosstalk generating area which is calculated based on the disparity image illustrated in FIG. 7B and the response speed of a display panel. For example, if crosstalk recognition properties which correspond to the respective grayscale values of the left-eye and right-eye images in consideration of the response speed of a display panel are pre-stored, it is possible to predict the possible crosstalk generating area of a 3D image.

Figure 8:
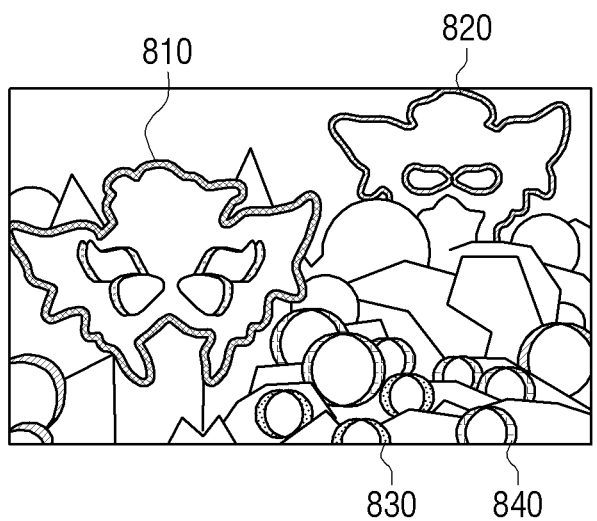
FIG. 8 is a view which illustrates a method for displaying a crosstalk generating area according to an exemplary embodiment.

FIG. 8 is a view which illustrates a method for displaying a crosstalk generating area according to an exemplary embodiment.

As illustrated in FIG. 8, the crosstalk generating area with respect to a received image may be displayed by using different respective colors 810, 820, 830, and 840 based on a generated degree of crosstalk.

Figure 9A:
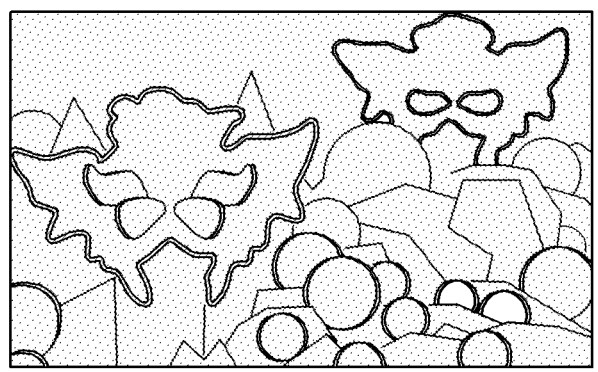
FIGS. 9A, 9B, and 9C are views which illustrate a method for displaying a crosstalk generating area according to another exemplary embodiment.
Figure 9B:
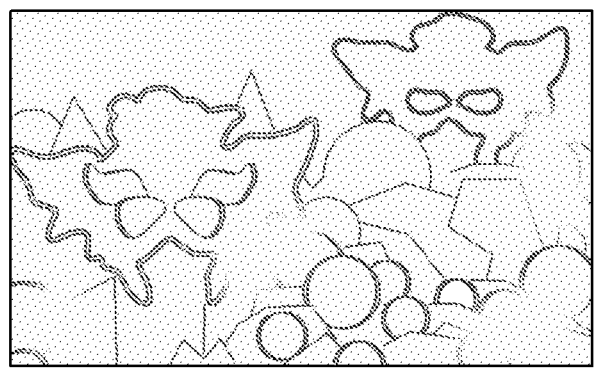
Figure 9C:
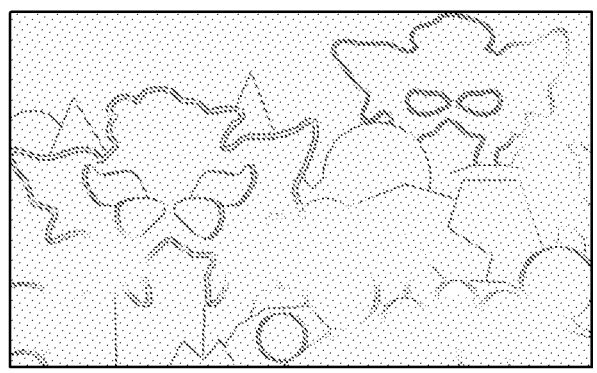

FIGS. 9A, 9B, and 9C are views which illustrate a method for displaying a crosstalk generating area according to an exemplary embodiment.

As illustrated in FIGS. 9A, 9B, and 9C, if a crosstalk generating area is divided into a plurality of levels based on a respective generated degree of crosstalk, only the crosstalk generating area having a degree of crosstalk which is higher than a preset threshold degree of crosstalk may be displayed.

FIG. 9A illustrates a case in which the threshold degree of crosstalk for displaying a crosstalk generating area is set to a relatively low level. As illustrated in FIG. 9A, if the threshold level is set to a minimum value, almost every crosstalk generating area may be displayed.

FIG. 9B illustrates a case in which the threshold degree of crosstalk for displaying a crosstalk generating area is set to a medium level. As illustrated in FIG. 9B, if the threshold level is set to a medium value, only the crosstalk generating areas having a degree of crosstalk which is higher than the corresponding threshold level may be displayed.

FIG. 9C illustrates a case in which the threshold degree of crosstalk for displaying a crosstalk generating area is set to a relatively high value. As illustrated in FIG. 9C, if the threshold level is set to a high value, only part of an area having a degree of crosstalk which is higher than the corresponding threshold level may be displayed as a crosstalk generating area.

Accordingly, a user may check only the crosstalk generating areas which have a desired degree of crosstalk by adjusting the threshold level.

Figure 10:
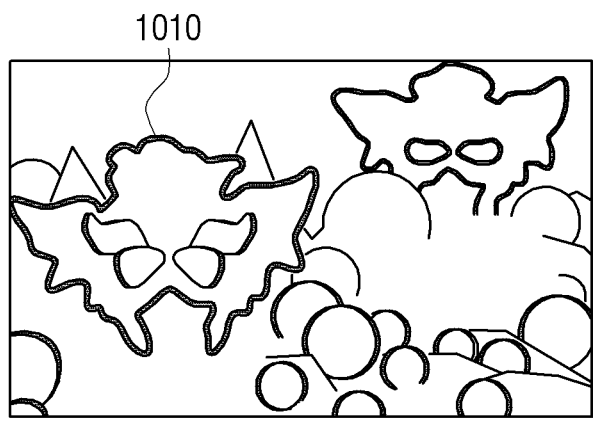
FIG. 10 is a view which illustrates a method for displaying a crosstalk generating area according to another exemplary embodiment.

FIG. 10 is a view which illustrates a method for displaying a crosstalk generating area according to another exemplary embodiment.

As illustrated in FIG. 10, the crosstalk generating area may be displayed by using a same color so that a user may easily identify the crosstalk area. In this case, there may be various ways for displaying a crosstalk generating area, for example, only the crosstalk generating areas which belong to a group having a degree of crosstalk which is higher than a preset threshold level may be displayed in the same color.

Figure 11:
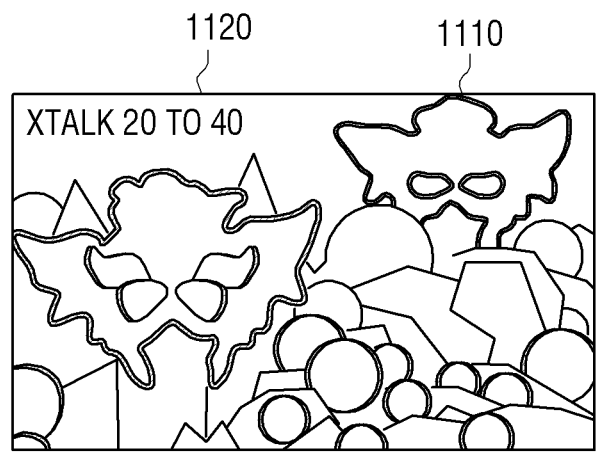
FIG. 11 is a view which illustrates a method for displaying a crosstalk generating area according to another exemplary embodiment.

FIG. 11 is a view which illustrates a method for displaying a crosstalk generating area according to another exemplary embodiment.

As illustrated in FIG. 11, not only the crosstalk generating area 1110 but also the type of displayed information and information 1120 relating to a threshold value may be displayed. For example, textual information "X-TALK 20 TO 40" may be displayed as illustrated in FIG. 11 so that a user may recognize that the displayed part is an area in which the generated degree of crosstalk of the respective crosstalk generating area is within a range of between 20 and 40.

Figure 12:
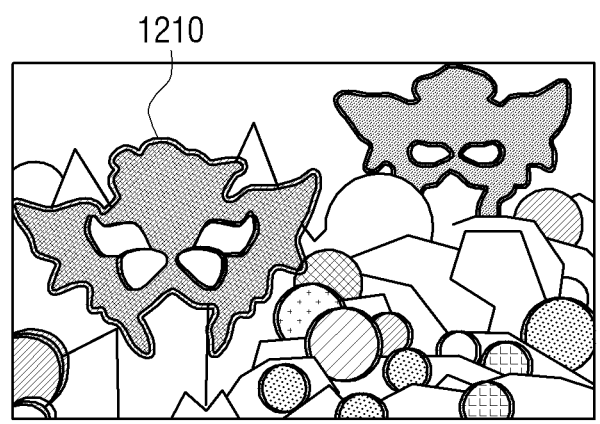
FIG. 12 is a view which illustrates a method for displaying a crosstalk generating area according to another exemplary embodiment.

FIG. 12 is a view which illustrates a method for displaying a crosstalk generating area according to another exemplary embodiment.

As illustrated in FIG. 12, the crosstalk generating area 1210 may be displayed by being overlaid with respect to the original image. In particular, the original image and the display information representing the crosstalk generating area may be blended and displayed.

Further, although not illustrated in FIG. 12, the transparency of the crosstalk generating area which is overlaid with respect to the original image may be faded automatically with time and displayed. Accordingly, a user may easily identify which portion of the object included in a 3D image is indicated by the corresponding display information, and how the indicated portion of the object affects the image.

In the above exemplary embodiments, only the various methods for displaying a crosstalk generating area have been described. However, the above methods may also be applied to a method for displaying a disparity image based on the scale of grayscale disparity for each of left and right images.

Figure 13:
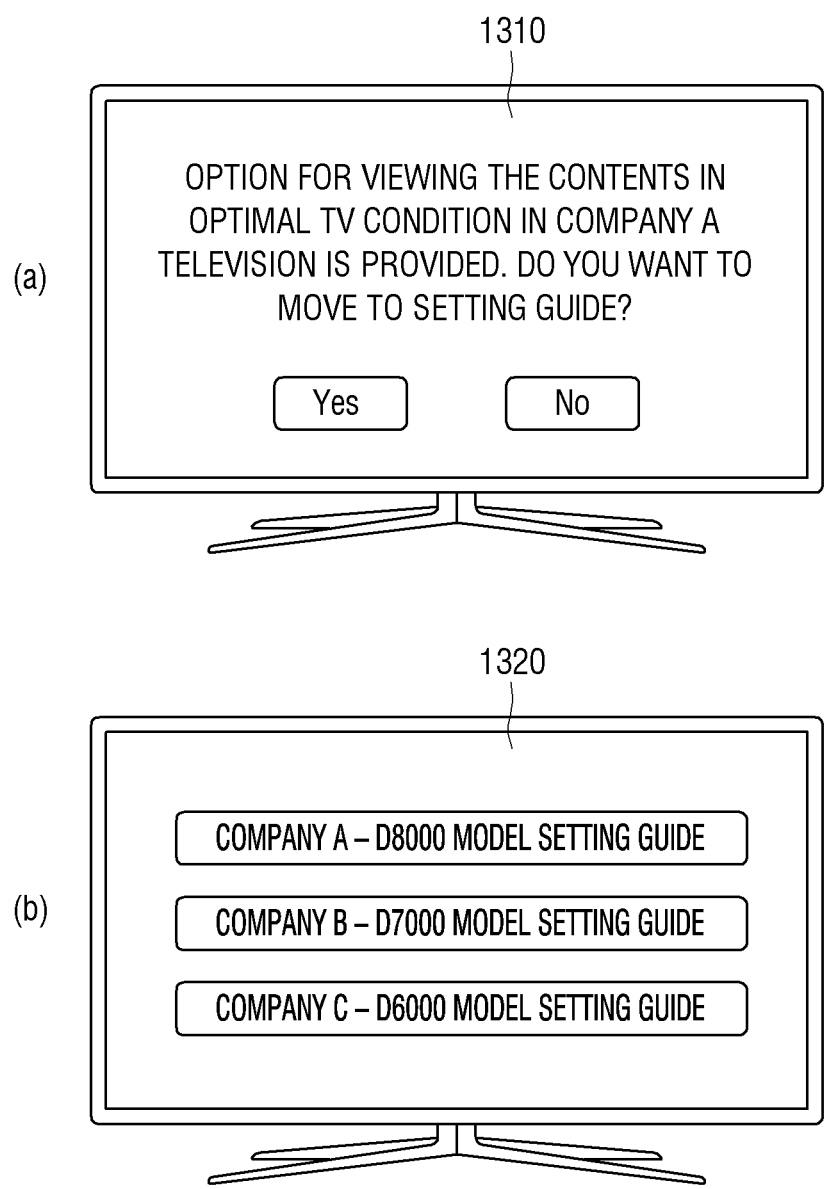
FIG. 13 provides two views which illustrate a user interface screen according to an exemplary embodiment.

FIG. 13 provides two views which illustrate a user interface screen according to an exemplary embodiment.

Referring to view (a) of FIG. 13, in one exemplary embodiment, if a crosstalk generating area with respect to a specific content is detected, the corresponding information may be provided to the viewer to enable the viewer to view the content in an optimum viewing condition.

By way of example, content may be simulated via a broadcasting monitor of company A and the cross generating area may be detected. If the cross generating area is detected, 3D view options may be set using the detected information, and a guide which includes information relating to the corresponding options may be added to the corresponding content and provided. Accordingly, if the content is selected, the user interface screen 1310 may be displayed to notify the user that the option setup guide is provided.

Referring to view (a) of FIG. 13, if "Yes" is selected on the user interface screen, screen 1320 which provides the setup guide lines for respective TV models of company A, company B, and company C may be provided as illustrated in view (b) of FIG. 13 so that the viewer may select the model.

Of course, if 3D option setup guidelines for respective manufacturers are added to the content, the user interface screen which enables the viewer to select the manufacturer may also be provided.

Further, although an example in which the viewer watches the content by using a TV is described above, this is not limiting. Accordingly, the same exemplary embodiment is applicable to a situation in which the viewer watches contents by using at least one of a DVD player, a Blue Ray Disc player, a smartphone application, a smart TV application, and/or any other suitable device which is usable for watching content.

Figure 14:
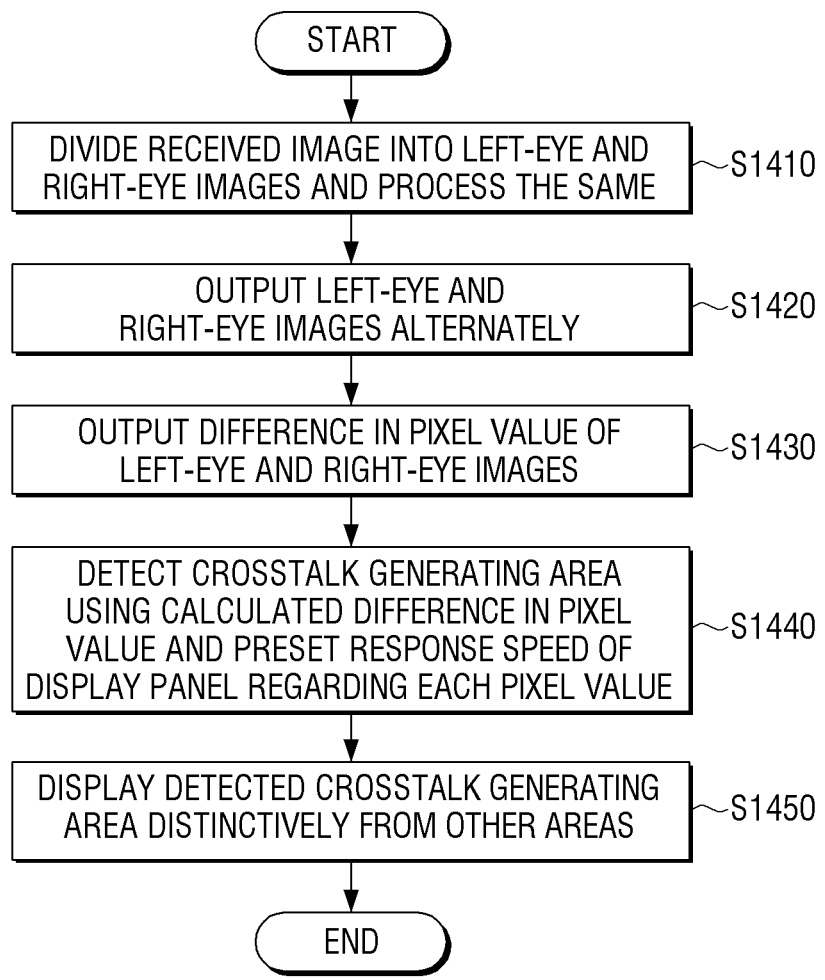
FIG. 14 is a flowchart which illustrates a method for controlling a display apparatus according to an exemplary embodiment.

FIG. 14 is a flowchart which illustrates a control method which is performable by using a display apparatus, according to an exemplary embodiment.

Referring to the control method of the display apparatus illustrated in FIG. 14, at operation S1410, the received image is divided into left-eye and right-eye images and processed. If the received image is a 3D image, the corresponding image may be divided into left-eye and right-eye images, or if the received image is a 2D image, the image may be converted into a 3D image and then divided into left-eye and right-eye images.

At operation S1420, the divided left-eye and right-eye images are outputted alternatingly.

At operation S1430, a pixel value difference between respective left-eye and right-eye images is calculated based on units relating to pixels that constitute the left-eye and right-eye images which are alternatingly outputted.

At operation S1440, a crosstalk generating area is detected by using the calculated pixel value difference and a corresponding response speed of the display panel with respect to the pre-stored pixel values.

At operation S1450, the crosstalk generating area is indicated distinguishably from at least one other area of the received image.

In particular, the crosstalk generating area detected at operation S1450 may be divided into a plurality of levels based on a respective generated degree of crosstalk, and each of the plurality of levels may be displayed in different ways.

Further, at operation S1450, each of the plurality of levels may be displayed by using different respective colors based on the generated degree of crosstalk.

Further, at operation S1450, the crosstalk generating areas may be divided into a plurality of levels based on a respective generated degree of crosstalk, and only the areas having a degree of crosstalk which is higher than a preset threshold degree of crosstalk may be displayed.

Further, at operation S1450, the crosstalk generating areas may be displayed by using a same color.

Further, at operation S1450, the crosstalk generating areas may be overlaid with respect to the received image and displayed accordingly.

Further, at operation S1450, the transparency of the crosstalk generating areas may be varied as a function of time and displayed accordingly.

Further, the operation at S1440 for detecting the crosstalk generating area may include determining an area possibly having crosstalk based on the calculated pixel value difference, and detecting the crosstalk generating area by checking a respective response speed in correspondence with the variation of pixel values of each of the left-eye and right-eye images with respect to the area determined as possibly having crosstalk.

Further, a reference value which may be used to determine the area possibly having crosstalk may be received, and the operation at S1440 for detecting the area possibly having crosstalk may include detecting the area possibly having crosstalk based on whether the calculated pixel value exceeds the received reference value.

Further, 3D option setup guide lines for minimizing the crosstalk effect at the detected crosstalk generating area may be provided.

The 3D option setup guideline may include a 3D option setup guide line according to at least one of a display device manufacturer and a product model.

Further, in various exemplary embodiments, a display apparatus having a limited panel response time, such as an active shutter glass type, a passive patterned retarder type, and/or an active retarder type may be implemented.

Further, if the display apparatus is implemented as a standard broadcasting monitor, the display apparatus may be designed with the best specifications to suit the uniformity, color or luminance requirements for broadcast content.

Further, in various exemplary embodiments, the calculated information may be inserted into various types of information media in order to be provided to the viewer.

As described above, according to various exemplary embodiments, an intuitive remote control method may be provided to users.

In particular, the methods according to various exemplary embodiments may be realized only by upgrading software of the existing display apparatus.

A non-transitory computer readable medium in which a program to perform various controlling methods sequentially according to an exemplary embodiment may be provided.

The non-temporal recordable medium refers to a medium which may store data semi-permanently rather than storing data for a short time, such as, for example, a register, a cache, and/or a memory, and may be readable by an apparatus. Specifically, the above-mentioned various applications or programs may be stored in a non-temporal recordable medium such as CD, DVD, hard disk, Blu-ray disk, USB, memory card, and ROM and provided therein.

In the above block diagram illustrating the display apparatus, a bus is illustrated, but communication between each component element in the display apparatus may be performed via the bus. In addition, each device may further include a processor such as a CPU performing the above-mentioned various steps and/or a microprocessor.

The foregoing exemplary embodiments and advantages are merely exemplary and are not to be construed as limiting the present disclosure. The present disclosure can be readily applied to other types of apparatuses. Further, the description of the exemplary embodiments is intended to be illustrative, and not to limit the scope of the claims, and many alternatives, modifications, and variations will be apparent to those skilled in the art.

What is claimed is:

1. A display apparatus, comprising:
   an image processor which divides a received image into a left-eye image and a right-eye image and processes the left-eye image and the right-eye image;
   an image output device which alternatingly outputs the left-eye image and the right-eye image; and
   a controller which calculates a pixel value difference between the left-eye image and the right-eye image based on units relating to pixels that constitute the left-eye image and the right-eye image, detects a crosstalk generating area by using the calculated pixel value difference and a preset response speed of a display panel, and controls so that the detected crosstalk generating area is displayed distinguishably with respect to at least one other area,
   wherein the controller determines an area in which the calculated pixel value difference is higher than a preset reference value as a possible crosstalk generating area, and detects the crosstalk generating area by checking a response speed of the display panel based on a respective change in each of a pixel value of the left-eye image and a pixel value of the right-eye image with respect to the determined possible crosstalk generating area.

2. The display apparatus as claimed in claim 1, wherein the controller controls so that the crosstalk generating area is divided into a plurality of levels based on a respective generated degree of crosstalk and so that each of the plurality of levels is displayed in a respective form.

3. The display apparatus as claimed in claim 2, wherein the controller controls so that each of the plurality of levels is displayed by using a respective color.

4. The display apparatus as claimed in claim 1, wherein the controller controls so that the detected crosstalk generating area is divided into a plurality of levels based on a respective generated degree of crosstalk and so that only a level having a corresponding generated degree of crosstalk which is higher than a preset threshold degree of crosstalk from among the plurality of levels is displayed.

5. The display apparatus as claimed in claim 1, wherein the controller controls so that only the crosstalk generating area is displayed by using a same color.

6. The display apparatus as claimed in claim 1, wherein the controller controls so that the crosstalk generating area is displayed as an overlay with respect to the received image.

7. The display apparatus as claimed in claim 6, wherein the controller controls so that a transparency of the crosstalk generating area varies as a function of time.

8. The display apparatus as claimed in claim 1, wherein the controller controls so that the possible crosstalk generating area is displayed distinctively with respect to at least one other area.

9. The display apparatus as claimed in claim 1, further comprising:
   a storage device which stores the preset response speed of the display panel.

10. The display apparatus as claimed in claim 1, further comprising:
    a communication device which receives the preset response speed of the display panel by communicating with an external apparatus,
    wherein the controller detects the crosstalk generating area by using the received preset response speed of the display panel.

11. A method for controlling a display apparatus, comprising:
    separating a received image into a left-eye image and a right-eye image and processing the left-eye image and the right-eye image;
    outputting the left-eye image and the right-eye image alternatingly;
    calculating a pixel value difference between the left-eye image and the right-eye image based on units relating to pixels that constitute the left-eye image and the right-eye image;
    detecting a crosstalk generating area by using the calculated pixel value difference and a preset response speed of a display panel; and
    displaying the detected crosstalk generating area distinguishably with respect to at least one other area,
    wherein the detecting the crosstalk generating area comprises:
    determining an area in which the calculated pixel value difference is higher than a preset reference value as a possible crosstalk generating area; and
    detecting the crosstalk generating area by checking a response speed of the display panel based on a respective change in each of a pixel value of the left-eye image and the right-eye image with respect to the determined possible crosstalk generating area.

12. The method as claimed in claim 11, wherein the displaying comprises dividing the detected crosstalk generating area into a plurality of levels based on a respective generated degree of crosstalk, and displaying each of the plurality of levels in a respective form.

13. The method as claimed in claim 12, wherein the displaying comprises displaying each of the plurality of levels by using a respective color.

14. The method as claimed in claim 11, wherein the displaying comprises dividing the detected crosstalk generating area into a plurality of levels based on a respective generated degree of crosstalk, and displaying only a level having a corresponding generated degree of crosstalk which is higher than a preset threshold degree of crosstalk from among the plurality of levels.

15. The method as claimed in claim 11, wherein the displaying comprises overlaying the crosstalk generating area with respect to the received image and displaying the overlaid crosstalk generating area.

16. The method as claimed in claim 15, wherein the displaying comprises varying a transparency of the crosstalk generating area as a function of time.

17. The method as claimed in claim 11, further comprising:
    displaying the possible crosstalk generating area distinctively with respect to at least one other area.

18. The method as claimed in claim 10, wherein the preset response speed of the display panel includes at least one of a display response speed which corresponds to a pre-stored pixel value change and a display response speed which corresponds to a pixel value change received from an external source.

19. A non-transitory computer readable medium having recorded thereon a program executable by a computer for performing a method for controlling a display apparatus, the method comprising:

separating a received image into a left-eye image and a right-eye image;

outputting the left-eye image and the right-eye image alternatingly;

calculating a pixel value difference between the left-eye image and the right-eye image based on units relating to pixels that constitute the left-eye image and the right-eye image;

detecting a crosstalk generating area by using the calculated pixel value difference and a preset response speed of a display panel; and using the display apparatus to display the detected crosstalk generating area distinguishably with respect to at least one other area, wherein the detecting the crosstalk generating area comprises:

determining an area in which the calculated pixel value difference is higher than a preset reference value as a possible crosstalk generating area; and detecting the crosstalk generating area by checking a response speed of the display panel based on a respective change in each of a pixel value of the left-eye image and the right-eye image with respect to the determined possible crosstalk generating area.

* * * * *